E. M. CONRAD.
VEHICLE SPRING TIRE.
APPLICATION FILED OCT. 27, 1913.
1,172,434.
Patented Feb. 22, 1916.
2 SHEETS—SHEET 1.
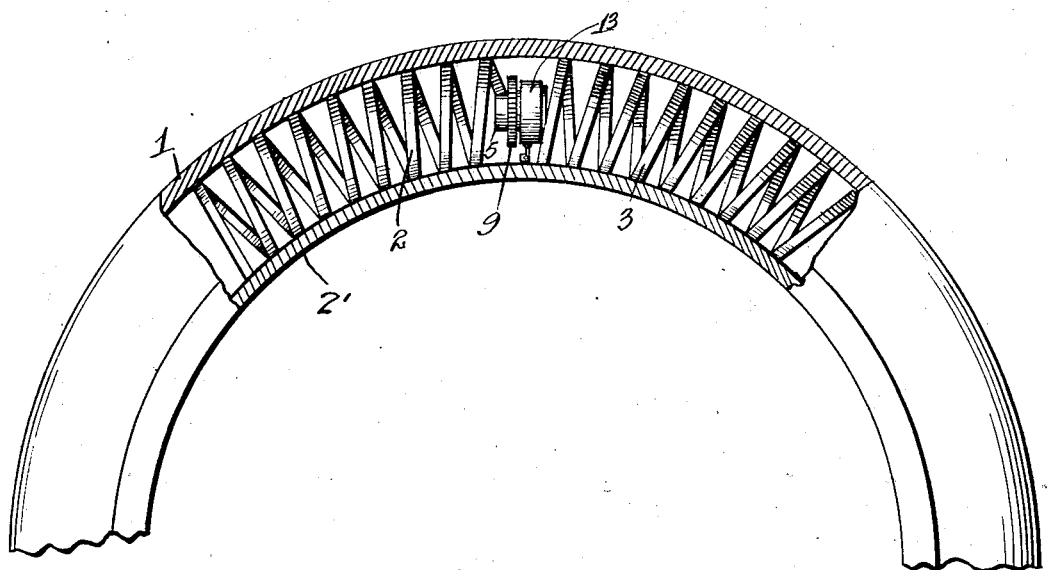
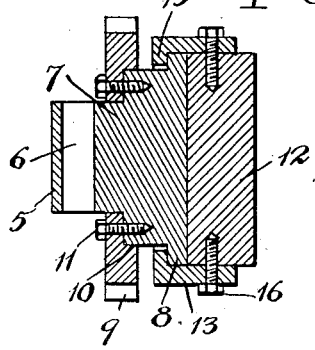
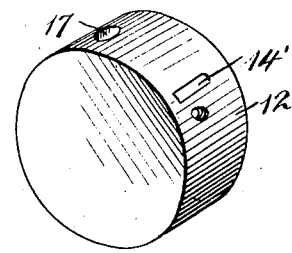
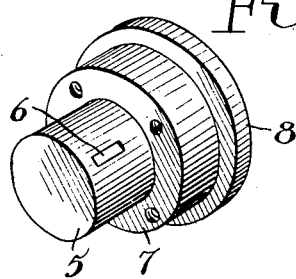
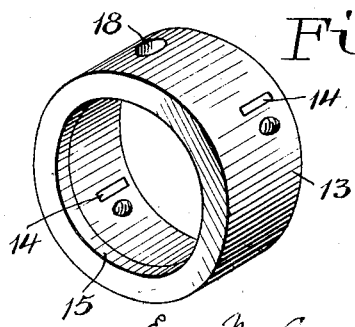

E. M. CONRAD.
VEHICLE SPRING TIRE.
APPLICATION FILED OCT. 27, 1913.

1,172,434.

Patented Feb. 22, 1916.
2 SHEETS—SHEET 2.

Witnesses
Wm H. Mulligan.

Inventor
Ezra M. Conrad,
By
his Attorney

UNITED STATES PATENT OFFICE.

EZRA M. CONRAD, OF SEVILLE, OHIO.

VEHICLE SPRING-TIRE.

1,172,434. Specification of Letters Patent. Patented Feb. 22, 1916.

Application filed October 27, 1913. Serial No. 797,475.

*To all whom it may concern:*

Be it known that I, EZRA M. CONRAD, a citizen of the United States, residing at Seville, in the county of Medina and State of Ohio, have invented certain new and useful Improvements in Vehicle Spring-Tires, of which the following is a specification.

My invention relates to an improvement in the class of spring tires for vehicles in which the tire comprises an endless spring coil confined about the wheel rim and enveloped by a hollow casing.

It is one of the objects of my invention to connect the meeting terminals of the spring coil by a device adapted to be actuated so as to coil the spring and reduce its diameter for insertion into the casing, and thereafter, adapted to be released to permit the spring to uncoil to a diameter limited only by expansion of the casing so that the latter will act as the yielding tread to cushion jars and jolts under spring action instead of air action.

A further novel feature of the invention consists in means for operating the device which is connected with the ends of the spring coil so as to coil the spring to a reduced diameter for insertion into the casing.

Further features and objects of the invention will be more fully described in connection with the accompanying drawings and will be more particularly pointed out and ascertained in and by the appended claims.

Figure 2:
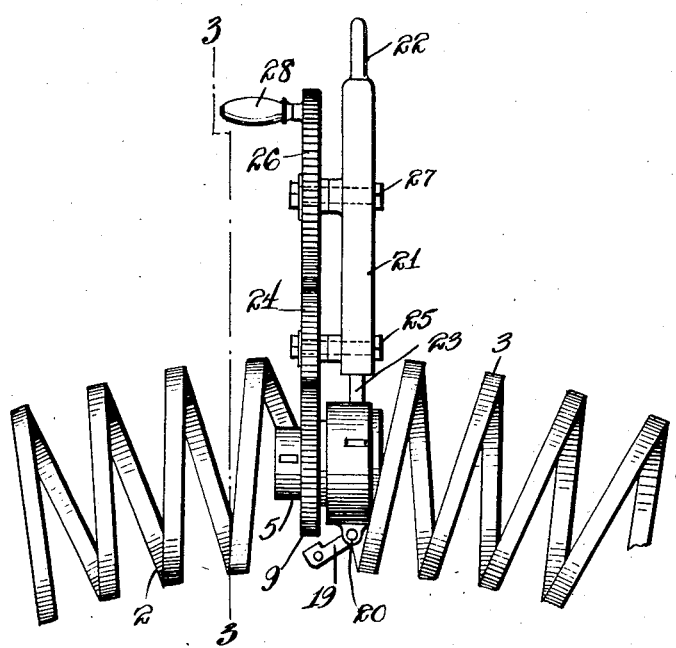
Figure 3:
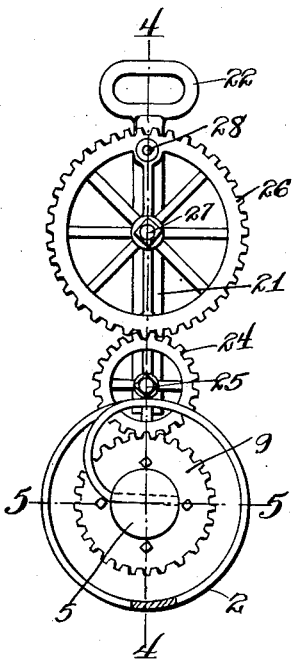
Figure 4:
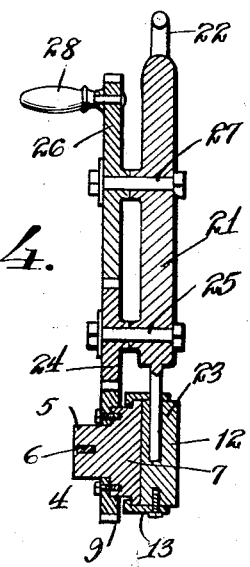

In the drawings:—Figure 1 is a side view of a tire casing of the divided type showing a portion broken away to illustrate the application of my invention thereto. Fig. 2 is a fragmentary view of the coil spring ends showing a device connected with the coil spring ends and the mechanism for operating said device to coil the spring to a reduced diameter. Fig. 3 is a sectional view on line 3—3 of Fig. 2. Fig. 4 is a sectional view on line 4—4 of Fig. 3. Fig. 5 is a sectional view on line 5—5 of Fig. 3. Fig. 6 is a perspective view of a coil end connecting element. Fig. 7 is a perspective view of another coil end connecting element. Fig. 8 is a perspective view of a part of the coil end connecting element shown in Fig. 6.

Like characters of reference designate similar parts throughout the different figures of the drawings.

As illustrated, 1 designates a tire casing of any approved divided type and 2 designates a coil spring disposed therein while 2' designates a wheel rim on which the inner face of the coil spring is adapted to rest. I prefer to use a coil spring formed of a flat resilient strip, or at least a strip which presents flat surfaces, as indicated at 3, for engagement with the inner face of the casing, it being understood that the term "flat faces" is used in connection with the faces 3 extending substantially transversely of the direction of coil of the strip.

First, referring to the device for connection with the adjacent terminal ends of the coil spring, 4 designates one coil end connecting member which is provided with a reduced hub 5 having a passage 6 therein extending radially therethrough. Said member 4 is provided with an enlarged base 7 having a flange 8 projecting therefrom. On the base 7 I mount a gear wheel 9, which is annually recessed or shouldered, as indicated at 10, and which may be secured on the enlarged base 7 by means such as screws 11, as clearly indicated in Fig. 5. A coupling head 12 is connected in abutting relation with the base 7 by a coupling ring 13 which latter functions as the remaining coil end connecting member and which is provided with radially disposed openings or slots 14 through which the coil end is projected. The coupling head 12 may be provided with a similar opening 14' for registry with the openings 14. The coupling ring 13 is provided with a flange 15 for embracing the flange 8 whereby the member 4 may be coupled in rotative connection with the member 13 and its head 12. The member 13 may be secured to the head 12 by means such as screws 16, as clearly shown in Fig. 5. The coupling ring 13 and the head 12, which constitute one spring end member or structure, may be provided with registering openings 17 and 18 which will function as retaining openings to hold one part of the structure non-rotatable while the other part is being rotated so as to coil the spring, in a manner which will hereinafter more fully appear. In order to lock the device, or the independent rotatable portions thereof against independent rotation when the spring is coiled to a small diameter, I may provide a pawl 19, pivoted at 20 on the retaining coil end structure and adapted to be moved into engagement with the teeth of gear 9 to lock the rotatable coil end structure. It will be understood that there will be ample friction to hold the pawl in engagement with the gear wheel 9 when the same is locked.

I will next refer to the mechanism whereby one of the coil end connecting members is retained against movement and whereby movement is imparted to the other coil end connecting members so as to coil the spring to a reduced diameter. As shown, such mechanism may comprise a support 21 provided on one end with a suitable handle 22 and on the other end with a shank 23, which latter is adapted to be inserted into the openings 18 and 17, as shown in Fig. 4, to hold the retaining or one of the end coupling members against movement. A gear 24 is mounted on said support 21 by means of a spindle 25 and is adapted to mesh with gear 9. An operating gear 26 is mounted on said support by means of a spindle 27 and is arranged to mesh with gear 24. The operating gear 26 is provided with a handle 28 for rotation of the same.

It will be readily seen from the foregoing construction that when the retaining shank 23 is inserted in place as shown in Fig. 4, that one end of the coil spring will be arrested against movement whereas the other end, upon operation of the gear 26, will be turned so as to place the coil spring under tension and coil the same to a reduced diameter. After the spring is placed in the casing and the casing has been secured upon the rim, with the pawl 19 in suitable registry with an opening in the rim, the pawl 19 can be retracted to the position shown in Fig. 2 so as to release the coil retaining device and permit the spring to uncoil to the fullest diameter permitted by expansion of the casing. It will of course be clear that after the spring has been coiled to a reduced diameter and locked by the pawl 19, that the operating mechanism shown in Fig. 3 will be withdrawn so as to permit the spring to be inserted into the casing. After the spring has been inserted in the casing and released to expand to its full diameter, the connecting device functions as a means for connecting the ends of the spring against separation.

While I have herein shown and described one specific form of my invention, I do not wish to be limited thereto except for such limitations as the claims may import.

I claim:—

1. In a spring tire, a coil spring, a member secured to one end of the spring, a second member secured to the remaining end and rotatably connected with said first named member, and a pawl connected with one member to engage with the second member to lock the members against independent rotation.

2. In a spring tire, a coil spring, a member secured to one end of the spring, a second member secured to the remaining end and rotatably connected with said first member, and a gear wheel carried by one of the members for rotating the same to coil the spring in a reduced diameter.

3. In a spring tire, a coil spring, a member secured to one end of the spring, a second member secured to the remaining end and rotatably connected with said first member, a gear wheel carried by one of the members and a pawl carried by the other member to engage with the teeth of the gear to lock the members against independent rotation.

4. In a spring tire, a coil spring, a flange member secured to one end of the spring, a second member secured to the remaining end, and a coupling ring fastened to the second member and having a flange for engagement with the flange of the first-named member for rotatably connecting the members together, and means carried by one of said members for engagement with the second member to lock the members against independent rotation.

In testimony whereof I affix my signature in presence of two witnesses.

EZRA M. CONRAD.

Witnesses:
C. H. EGNER,
W. G. BRUMBAUGH.